July 24, 1928.

R. R. McCLURE 1,678,347

METHOD OF AND APPARATUS FOR LUBRICATING FRICTION SURFACES

Filed May 24, 1924  2 Sheets-Sheet 1

July 24, 1928.
R. R. McCLURE
1,678,347
METHOD OF AND APPARATUS FOR LUBRICATING FRICTION SURFACES
Filed May 24, 1924 2 Sheets-Sheet 2
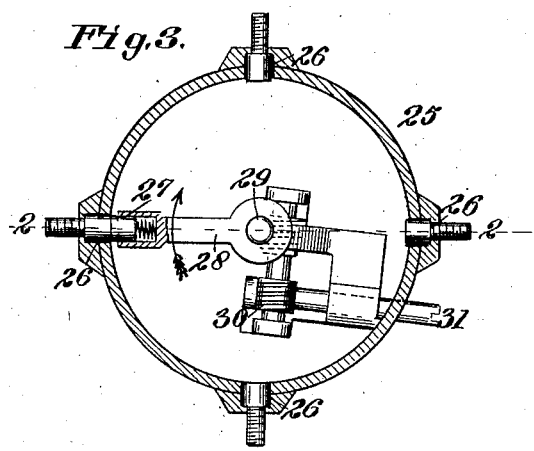
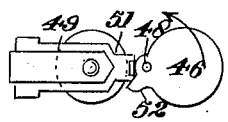
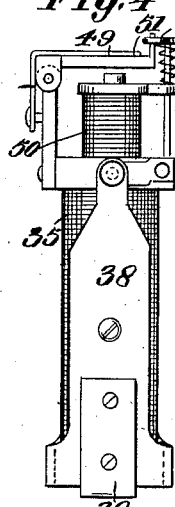
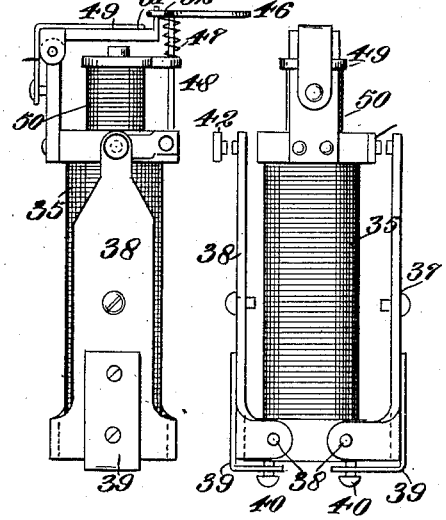
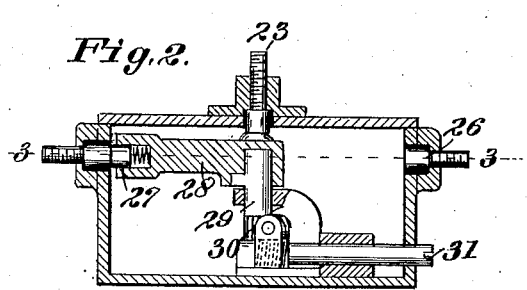
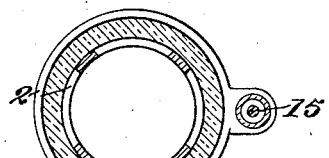
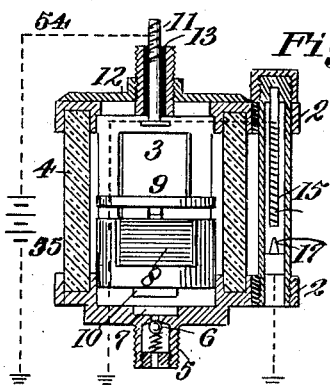

Patented July 24, 1928.

1,678,347

UNITED STATES PATENT OFFICE.

RALPH R. McCLURE, OF SAN FRANCISCO, CALIFORNIA.

METHOD OF AND APPARATUS FOR LUBRICATING FRICTION SURFACES.

Application filed May 24, 1924. Serial No. 715,762.

The periodic lubrication of friction surfaces by automatic means rather than relying on the human element has demonstrated that surfaces so lubricated are less liable to become overheated or to require early replacement due to repeated wear occasioned by a slight interval of non-lubrication. It has been the practice heretofore that an operator or oiler supply oil or grease cups with a charge of lubricant by a personal inspection and attention to each cup, and if the same were not gravity fed, to cause an actuation thereof at the time of filling or inspection. This has resulted in many serious injuries due to the requirement of the operator in inspection or filling to reach into the paths of moving elements of operating machinery. Heretofore it has been the custom when employing liquid lubricant, such as oil, to permit the same to feed by gravity to the friction surface to be lubricated, and in structures employing heavy grease to feed the same to the surface by application of pressure. By my present method and apparatus, I propose to lubricate friction surfaces by the application thereto of a charge of lubricant, preferably oil under pressure, the control of the application of which is at a point distant from the friction surfaces, and is capable of operation in any suitable manner and by any suitable means or mechanism.

In the embodiment of the invention illustrated in the carrying out of my improved method of lubricating friction surfaces, I illustrate a wired circuit connection between the lubricant applying member and its control station.

In my present invention, it is one of the prime objects to supply a charge of lubricant to the friction surface at suitable intervals, which intervals may be controlled by timed mechanism, speed mechanism, stroke mechanism, revolution mechanism, or any other suitable means, the operation of which in turn causes an actuation of the lubricant applying means.

In the carrying out of my method, I prefer to use that type of oil cup illustrated in Letters Patent No. 1,454,123 granted to me May 8th, 1923, an embodiment of which is illustrated in the accompanying drawings, and in connection with the operating circuit therefor I desire to employ a signal circuit, although the latter may be dispensed with; however, its employment indicates or signals to the party in control the fact whether certain oil cups are or are not working.

By my present method friction surfaces located at normally inaccessible places, the lubrication of which is universally neglected, are readily lubricated by the actuation of the lubricating mechanism from a point distant from the surface and within convenient reach of an operator. The present method of lubrication will simplify the oiling of machinery generally, particularly motor driven vehicles, ship machinery, textile and general mill apparatus, printing presses, and in fact, its field is unlimited, particularly where numerous bearings located at inaccessible pleaces near moving elements dangerous to men are present.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

In the drawings illustrating my method and apparatus application, and which are referred to in the specification:—

Figure 2 is a vertical sectional view of one form of master control device, the same being illustrated as a conventional distributor, it being understood that the main shaft thereof may be operated by any suitable mechanism.

Figure 3 is a transverse horizontal sectional view taken on line 3—3 of Figure 2.

Figure 4 is a view in side elevation of one form of over and under load relay.

Figure 5 is a view in front elevation of the over and under load relay illustrated in Figure 4.

Figure 6 is a view in top plan of the apparatus illustrated in Figures 4 and 5 disclosing more particularly the indicator devices in the signal circuit.

Figure 7 is a view in vertical section of the preferred embodiment of the oil cup, the same having a thermostat associated therewith.

Figure 8 is a transverse sectional view on line 8—8 of Figure 7, and

Figure 9 is a modified form of circuit and cup construction wherein the operation of the thermostat is the sole control for the actuation of the cup.

Figure 1:
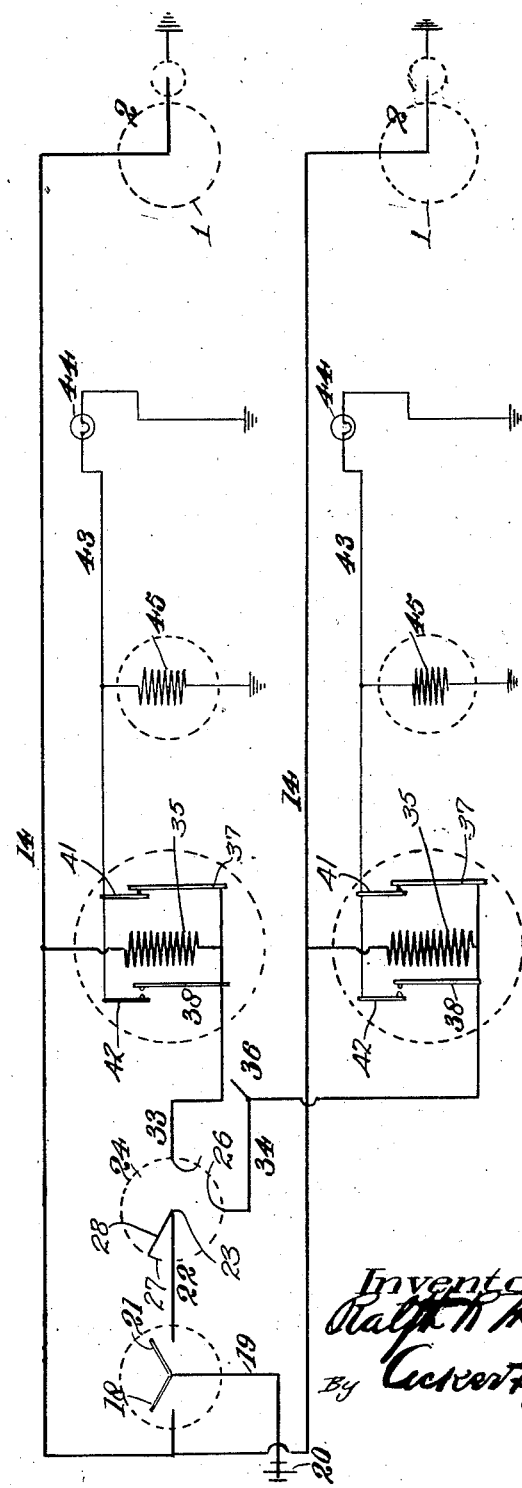
Figure 1 is a diagrammatic view illustrating a plurality of oil cups, an operating circuit therefor, signal circuits, control device in the signal circuits, and several types of circuit closing devices.

In the drawings, the numeral 1 indicates generally the oil cup set forth in my United States Letters Patent No. 1,454,123 granted to me on May 8th, 1923, and while in the diagram Figure 1, I illustrate two cups the system may contain any number each of which may be briefly described as follows:—
Each cup consists of a cylindrical shell 2, a portion of the side wall of which is cut away as at 3 to afford sight openings, and the side wall of the shell retains in any suitable manner a cylindrical body 4 preferably of glass which serves as a side wall for retaining a quantity of oil within the body. The lower end of the body 2 is provided with a tubular exteriorly threaded attaching nipple 5, the orifice of which is normally closed by an outwardly opening spring seated valve 6 which is located preferably at the base of a collecting chamber or sump 7 within the body 2. Within the chamber 2 there is mounted an electromagnet 8, with which co-operates an armature 9, the lower end of which is enlarged forming a plunger 10 operating within the sump 7. The plunger snugly fits within the sump each time the armature 9 is pulled downwardly toward the upper end of the electromagnet 8 when the magnet is energized. A spring, not shown, normally raises the armature 9 when the electromagnet 8 is not energized. A binding post 11 carried by and insulated from the cup cover 12, as at 13, affords a connection for the lead 14 of the operating circuit hereinafter described, the return connection or the second lead being preferably through a ground or suitable frame of conducting material. With the construction illustrated in Figure 7, there is employed a quick acting thermostatic bar 15 connected by means, not shown, with binding post 11, the thermostat being electrically insulated from its mounting as at 16. The thermostat is adapted to contact when expanded by heat with the point 17 in circuit with the cup 2, and in the illustration Figure 7 heat caused by the friction between the bearing surfaces when abnormal is transmitted through the cup body to the thermostat. The bar 15 and point 17 are illustrated as being protected from injury by a shielding tube 15'. Each lead 14 connects with a manually controlled switch 18 of any suitable contruction, from which extends a lead 19 connected with a suitable power source 20. The ground or conducting frame serves as the return lead between the source 20 and the cup 2, although any other suitable return circuit may be employed. A second manually operated switch 21 is associated with the lead 19 adjacent switch 18, the same being adapted to engage with the lead 22, the latter connecting preferably with contact point 23 of the distributor or automatic timing mechanism 24. The automatic timing mechanism 24 is illustrated as including a timing case or housing 25 within the peripheral wall of which are mounted, at suitable points, the spaced contact members 26. With these is adapted to contact, preferably through a wiping action, a movable brush 27 at the end of a rotor arm 28 rotatable about an axis 29 centrally of the casing 25. The rotor arm 28 is illustrated as having gear connection 30 with an operating shaft 31 extending exteriorly of the casing 25. This shaft 31 is adapted to be operated by many different forms of mechanism depending solely on the desired method to be employed for the operation of the oil cups at the necessary intervals of time. As for example, the shaft 31 may be connected to a time-piece in such manner that the arm 28 makes the desired movement within a given time. The shaft 31 may be connected with a speedometer when the device is used on a motor vehicle; or the shaft may be connected with one of the friction surfaces to be lubricated, its movement transmitting to the arm 28 the necessary movement to cause the operation of one or more cups. The binding post 23 affords a connection between the lead 22 through brush 27 and the binding posts 26 and from certain of said binding posts 26 extend the respective leads 33 and 34, they connecting respectively through coils 35 of under and over load relays with the leads 14 of their respective oil cup operating circuits. Two operating and signal circuits controllable by a single set of switches 18, 21 and 24 are illustrated in Figure 1. Between the leads 33 and 34 I mount a suitable switch 36, which, when closed enables the simultaneous operation of both cups 2 on the contact of brush 27 successively with the contacts 26 from which extend the leads 33 or 34. When the switch 36 is open the rotation of the arm 28 carrying the brush 27 causes the successive operation of the cups 2.

The relay coils 35 are positioned one in each operating circuit and a description of one, the others being duplicates, is thought will suffice. Associated with each coil are the overload and under-load contact arms 37 and 38, pivotally mounted as at 38', and with each of which is associated a flat steel spring 39, the tension of which resists the movement of the contacts in one direction. The springs are regulated by their associated adjusting screws 40. The arms 37 and 38 coact with the respective contact arms 41 and 42 from which extend the wire 43 of a signal circuit, within which is a signal 44 such as incandescent lamp, and also an enunciating or visible signal 45 consisting of a movable target or disk 46, Figures 4 and 6, normally held from view, but movable into view by a spring 47. The stem 48 mounts the target 46 and controlling the target is a pivotally mounted armature 49 actuated on the energization of a coil 50. The armature 49 has an extension 51 normally lying within the path of movement of the finger 52 of the disk 46; however the energizing of the coil 35 causes a corresponding energizing on a lesser scale of the coil 50 which actuates the armature 49 against the tension of spring 53 withdrawing the extension 51 from the finger 52 enabling the spring 47 to move the target into enunciating position, warning the operator that something is wrong in the cup or controlling circuit. The disk or target 46 remains exposed until reset, and while I have illustrated several forms of signal devices in the signal circuit, it is to be understood that any type of signal necessary in any particular installation is adapted to be used.

In the circuit embodiment illustrated in Figure 9 it will be observed that I illustrate a circuit consisting of a lead 54, a battery 55 and a switch 56, the completion of the circuit through the frame or other common members being accomplished on the contact of the member 15 of the thermostat with its co-operating point 17. This installation enables the employment of a sensitive thermostat controllable by a very slight variation in the temperature of the friction surface to be lubricated thus insuring a supply of lubricant to the surfaces each time contact is made between the points 15 and 17 when the switch is closed.

A detailed working description of the system is as follows. From the supply source 20 the current passes through a switch 21 when in closed position, on through conductor 22 and through terminal 23, Fig. 2, then through rotary arm 28 and the attached brush 27, and when said arm 28 is caused to rotate by proper force exerted on shaft 29, 30, 31 into contact with one of the terminals 26, the current then passes through the connecting conductor, such as 33 or 34, Fig. 1, then through the signal relay coil 35 and on through conductor 14 to the oil cup, and its attached thermostat, and completing its return through the common return or grounded frame to source of supply 20.

The current passing through coil 35 causes sufficient magnetic attraction to attract signal arm 38 inward, which is normally in closed position, or in contact at points 42, Fig. 5, due to spring tension 39. This magnetic attraction is sufficiently quick and the arm 38 responds to it so quickly that contact is broken at points 42 to cause no movement or action in the annunciator 45 or the signal 44, this being due to the different tension on springs 39, Fig. 5, and annunciator spring 53, Fig. 4. To illustrate the working of my signal system, signal arm 38 always breaks connection and moves inward when current passes through coil 35, as above explained. If the circuit should be open and control switch 21 is closed and the timing switch revolved, brush 27 making contact with terminal 26, the signal arm 38 remains closed and shows visibly that it is not working, the reason being that there is no magnetic attraction in coil 35 to move arm 38 against spring tension. If operating circuit 14, Fig. 1, breaks any place between the signal relay coil 35 and the ground or common return connection between 45 and 44 (signal devices) then relay arm 38 would remain in closed position and current would pass through contact points at 42 through signal conductor 43, then divide and part pass through annunciator coil 45 which would shown the number of the cup giving the trouble, the rest of the current passing through the signal device, a light or horn, which would immediately attract the attention of the proper person. The attendant going to the annunciator cabinet would immediately observe the number of the cup and bearing giving the trouble. The light or horn would continue to function till the open fault was found, and immediately on the trouble being remedied, the light or horn would cease to function. This, however, is providing that the rotary switch remained on contact at 26 and 27. When the two open leads were connected, current would again pass through coil 35 causing arm 38 to be attracted inward, breaking connection at points 42.

If supply circuit 14, Fig. 1, would become short circuited or grounded, additional current would pass through coil 35, this would increase the megnetism in the coil, and attract arms 38 and 37 inward, the latter against tension of spring 39; contact would be broken at points 42, but would be made at points 41 through arm 37. This would cause the same operation to take place with the trouble light and annunciator as stated in the preceding paragraph.

In Figs. 7 and 9 the heat from the bearing conducted through the base of the cup and rod, causes the thermostat rod 15 to expand and contact with point 17 and produces a short circuit, which influences the coil 35 and relay arms 37 and 38 as described above, but at this time the cup is operated.

It will be evident from the foregoing description of operation that this invention provides a lubricating system operable at a distance from the lubricant holder, which in turn is preferably located adjacent to the surfaces to be lubricated. One or more lubricant holders may be employed, according to the number of bearings to be lubricated, and the latter can be depended upon to be kept properly lubricated, and preferably to a definite or predetermined amount, even though the bearings may be located in inaccessible places, where it would be difficult, if not impossible, for the operator to reach them for purposes of lubrication.

Heretofore, where bearings have thus been located at a distance, or have been inaccessible (as is frequently the case) their lubrication has often been entirely neglected or only intermittently attended to. There has resulted cutting and serious injury to the bearings; the associated machines themselves being frequently reduced to enforced idleness with consequent loss.

This system on the contrary provides against these unfortunate conditions by insuring a certainty of lubrication at a distance from the operator, just as though the latter were to mechanically operate the individual lubricant holder or oil cup at the bearing itself. The attempt has been made in the past to accomplish this end by employing an extended tube or network of piping leading to the bearings, but the same has proved to be unsuccessful. In addition to frequent leakage in the piping itself; especially where the associated machinery has been subjected to constant vibration or jarring blows (as in the case of automobiles) there is almost certain to be a considerable loss of the lubricant at the joints of the piping; or the lubricant as a whole, following the lines of least resistance has been drained off through leakage at the bearing itself, where excess play has developed between the parts.

Or such piping systems have become inoperative because of obstructions occurring therein; due to the presence of foreign matter, or even of a bubble of air; which dangers are entirely avoided in this system.

In this system is shown an automatic control of the supply of the lubricant to the bearing, as by thermostatic action, although I do not limit myself to the latter means of automatic control. I have also shown a signalling device to indicate failure to function on the part of the lubricant holder, as in the case of a "dry" oil cup, from which for any reason the lubricant has become exhausted.

While by the described method and apparatus I have set forth that a portion of the contents of each cup is discharged on each operation, it is to be understood that a cup may be provided and so actuated as to discharge its entire contents on each operation.

It is understood that the enunciating and signalling means when operated indicates the individual control circuit within which the trouble is located.

By this method and apparatus, the maximum efficiency in lubrication is possible which will reduce wear to a minimum and which is operable with the minimum labor cost.

I claim:

1. An apparatus for lubricating friction surfaces consisting of a lubricant holder, an operating circuit, electrically operated lubricant expelling means associated with said holder and within said circuit, a thermostat associated with said holder and within said circuit, a make and break within the operating circuit, a signal circuit conductively coupled to the operating circuit, a signal therein, said thermostat in the signal circuit adapted for operation by the temperature of the friction surfaces to be lubricated.

2. An apparatus for lubricating friction surfaces consisting of a plurality of lubricant holders, one connected with each point of lubrication, an electrically operated lubricant expelling means associated with each holder, a plurality of operating circuits arranged in parallel and one connected with each expelling means, a timer within said operating circuit controlling the making and breaking thereof, a signal circuit inductively coupled with each operating circuit, and a signal in each signal circuit.

3. An apparatus for lubricating friction surfaces consisting of a plurality of lubricant holders, one connected with each point of lubrication and located in close proximity thereto, an electrically operated lubricant expelling means associated with each holder, a plurality of operating circuits arranged in parallel and one connected with each expelling means, a timer within said operating circuit for controlling the making and breaking thereof, a signal circuit inductively coupled with each operating circuit, a signal in each signal circuit, and means interconnecting said operating circuits whereby the expelling means therein may be operated by said timer either successively or simultaneously.

4. An apparatus for lubricating friction surfaces consisting of a lubricant holder connected with and located in close proximity to the surface to be lubricated, an electrically operated lubricant expelling means associated therewith, an operating circuit, a signal circuit, a signal within the latter circuit and a relay for controlling the operation of the signal dependent on a variation from normal of the condition of the signal circuit.

5. An apparatus for lubricating bearings consisting of a plurality of supplies of lubricant, one located in close proximity to each of the respective bearings, an electrically operated lubricant expelling means associated with each supply for controlling the discharge of lubricant under pressure to each bearing to be lubricated, an electric circuit connected with all of said expelling means and extended to a point distant therefrom, and means for energizing the circuit whereby said expelling means are successively operated.

6. An apparatus for lubricating bearings consisting of a plurality of supplies of lubricant, one located in close proximity to each of the respective bearings, an electrically operated lubricant expelling means associated with each supply for controlling the discharge of lubricant under pressure to each bearing to be lubricated, an electric circuit connected with all of said expelling means and extended to a point distant therefrom, and means for energizing the circuit whereby said expelling means may be either simultaneously or successively operated.

In testimony whereof I have signed my name to this specification.

RALPH R. McCLURE.